United States Patent
Sherf

(10) Patent No.: US 11,065,984 B2
(45) Date of Patent: Jul. 20, 2021

(54) SYSTEM FOR DETECTING THE PRESENCE OF AN OCCUPANT IN A VEHICLE AND MEANS THEREOF

(71) Applicant: DO NOT FORGET LTD., Bnei Brak (IL)

(72) Inventor: Pinhas Sherf, Bnei Brak (IL)

(73) Assignee: DO NOT FORGET LTD., Bnei Brak (IL)

(\*) Notice: Subject to any disclaimer, the term of this patent is extended or adjusted under 35 U.S.C. 154(b) by 0 days.

(21) Appl. No.: 16/481,067

(22) PCT Filed: Jan. 29, 2018

(86) PCT No.: PCT/IL2018/050097
§ 371 (c)(1),
(2) Date: Jul. 25, 2019

(87) PCT Pub. No.: WO2018/138728
PCT Pub. Date: Aug. 2, 2018

(65) Prior Publication Data
US 2019/0389329 A1    Dec. 26, 2019

Related U.S. Application Data

(60) Provisional application No. 62/451,726, filed on Jan. 29, 2017.

(51) Int. Cl.
*G08B 21/00* (2006.01)
*B60N 2/00* (2006.01)
(Continued)

(52) U.S. Cl.
CPC .............. *B60N 2/002* (2013.01); *B60Q 9/00* (2013.01); *B60N 2/26* (2013.01)

(58) Field of Classification Search
CPC . B60N 2/002; B60N 2/26; B60Q 9/00; G08B 21/22; G08B 21/24; G08B 29/188
(Continued)

(56) References Cited

U.S. PATENT DOCUMENTS 6,714,132 B2    3/2004  Edwards et al.
8,892,302 B1    11/2014 McDonald
(Continued)

FOREIGN PATENT DOCUMENTS

WO    2016149778    9/2016

OTHER PUBLICATIONS

International Search Report, International Application No. PCT/IL2018/050097, dated May 17, 2018.
(Continued)

*Primary Examiner* — Naomi J Small
(74) *Attorney, Agent, or Firm* — The Roy Gross Law Firm, LLC; Roy Gross

(57) ABSTRACT

A system for detecting a child left in a vehicle, in a coin-like shaped housing, includes: at least two disparate sensors for measuring parameters within a vehicle environment, an alerting mechanism for sending a signal to the vehicle user, and a processor for providing instructions. The system further includes a user interface platform (UIP) having a wireless network connection to at least one of the housing, a user, a vehicle operation system, a social network, an emergency system, a connectable subject and any combination thereof.

20 Claims, 1 Drawing Sheet

(51) Int. Cl.
*B60Q 9/00* (2006.01)
*B60N 2/26* (2006.01)

(58) Field of Classification Search
USPC .......................................................... 340/667
See application file for complete search history.

(56) References Cited

U.S. PATENT DOCUMENTS

| | | | |
|---|---|---|---|
| 9,227,484 B1 | 1/2016 | Justice et al. | |
| 9,266,535 B2 | 2/2016 | Schoenberg | |
| 9,741,224 B1* | 8/2017 | Singh ...................... | G08B 21/22 |
| 2013/0109342 A1 | 5/2013 | Welch | |
| 2015/0274036 A1* | 10/2015 | Arad ....................... | B60N 2/002 |
| | | | 340/573.1 |
| 2015/0379851 A1* | 12/2015 | Diels .................. | G06K 9/00771 |
| | | | 340/573.1 |
| 2016/0200250 A1* | 7/2016 | Westmoreland ........... | B60J 1/17 |
| | | | 340/457.1 |
| 2016/0379459 A1* | 12/2016 | Trang ..................... | G08B 21/24 |
| | | | 340/457 |
| 2017/0154513 A1* | 6/2017 | Hariri .................... | B60N 2/002 |
| 2017/0232887 A1 | 8/2017 | Clontz | |
| 2018/0130327 A1 | 5/2018 | Rogers et al. | |
| 2018/0342141 A1* | 11/2018 | Baker .................... | B60N 2/002 |

OTHER PUBLICATIONS

Written Opinion, International Application No. PCT/IL2018/050097, dated May 17, 2018.
Supplementary European Search Report of EP18744387 dated Jan. 9, 2020.

* cited by examiner

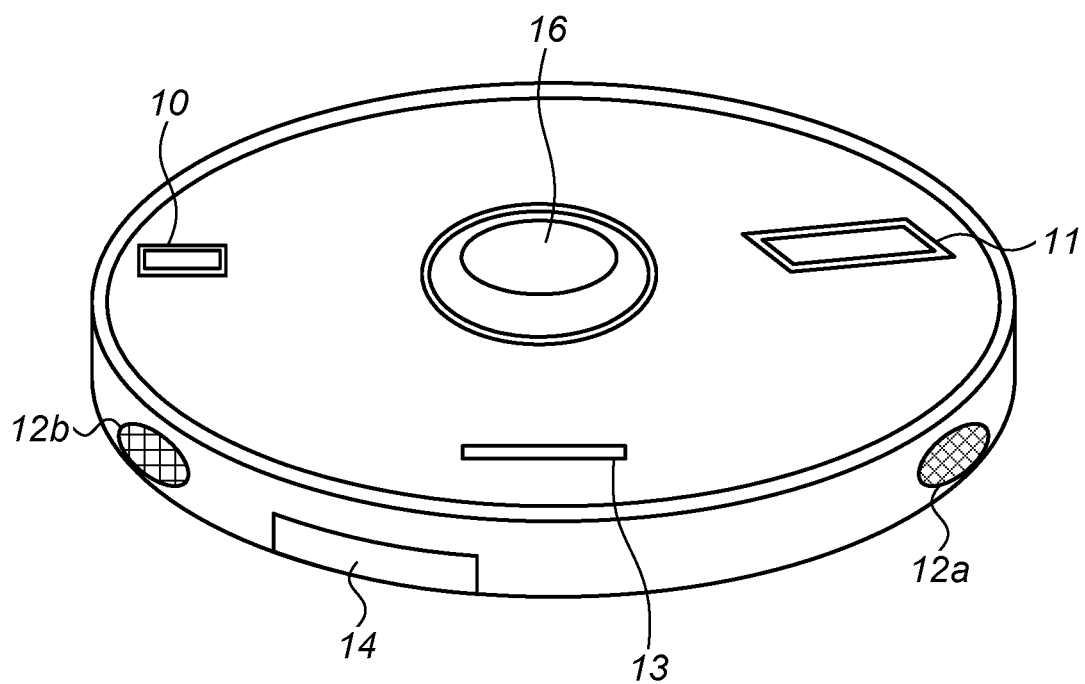

SYSTEM FOR DETECTING THE PRESENCE OF AN OCCUPANT IN A VEHICLE AND MEANS THEREOF

RELATED APPLICATIONS

This application is a National Phase of PCT Patent Application No. PCT/IL2018/050097 having International filing date of Jan. 29, 2018, which claims the benefit of priority of U.S. Provisional Application No. 62/451,726 filed on Jan. 29, 2017. The contents of the above applications are all incorporated by reference as if fully set forth herein in their entirety.

FIELD OF INVENTION

The present invention relates to a system for detecting the presence of an occupant such as a child in a vehicle. In particular, the invention pertains to a system for alerting a user if the vehicle has been parked or, abandoned by the driver or immobilized and a child has been left in the vehicle.

BACKGROUND OF THE INVENTION

In order to increase the safety of a child within a car variety of safety devices have been developed.

U.S. Pat. No. 5,793,291 discloses an alarm system for detecting the presence of a person locked in a parked automobile. The alarm system includes a motion detector and a temperature detecting element coupled to a NOR gate. The motion detector transmits a low signal to the NOR gate once it detects motion within the interior of the automobile. The temperature detecting element transmits a low signal to the NOR gate if the temperature in the automobile exceeds a pre-determined extreme temperature. The NOR gate, upon receiving low signals from both the temperature detecting element and the motion detector, transmits an alarm signal.

U.S. Pat. No. 5,949,340 relates to an apparatus for warning when a child has been left in an infant seat and a vehicle has been turned off. The apparatus includes an occupant detection mechanism for detecting the presence of an occupant within an infant seat located within a vehicle; an ignition detection mechanism for detecting the state of the vehicle's ignition system; a control unit for generating an alarm signal when the occupant detection mechanism detects the presence of an occupant within the infant seat and the ignition detection mechanism detects that the vehicle's ignition system has been turned from an "on" state to an "off" state; and an alarm units for generating an alarm in response to the alarm signal.

U.S. Pat. No. 6,922,147 discloses various systems and methods for reducing the likelihood of leaving an unattended child behind in an infant/child seat in a vehicle.

It therefore remains a long felt and unmet need to provide novel means and methods for an alerting system that is cost effective, easily operated, functions in a vehicle environment and enables wireless communication.

SUMMARY OF THE INVENTION

It is thus one object of the present invention to provide a portable system for detecting a child left in a vehicle, comprising
   i. a coin-like shaped housing comprising:
      a. at least two sensor means for measuring parameters within vehicle environment;
      b. an alerting means for sending a signal to the vehicle user; and
      c. a processor configured to provide instructions;
   ii. a user interface platform (UIP) for communication with at least one member selected from the group consisting of: said housing, a user, vehicle operation system, social network, emergency system, connectable subject and a combination thereof;
wherein housing is activated by at least one single finger pressable pad coupled to said housing; thereby, said sensor means provides a signal to said processor or/and UIP when said parameters are in the maximum or/and minimum values for instructing and operating the alerting means.

It is also an object of the present invention to provide the aforementioned system, wherein additionally comprising wireless means for receiving and transferring at least one signal from said sensor means to an emergency system.

It is also an object of the present invention to provide the aforementioned system, wherein the sensor means is selected from the group consisting of: a motion detector sensor, a temperature detector sensor, oxygen level sensor, $CO_{2\ level}$ sensor, voice detector, volume detector, mass detector, vital signs detector, sound detector, light/laser detector, pressure sensor, air exchange detector and any combination thereof.

It is also an object of the present invention to provide the aforementioned system, wherein further comprising at least one processor for storing or transferring data of the UIP.

It is also an object of the present invention to provide the aforementioned system, wherein the housing is connectable to the vehicle computer.

It is also an object of the present invention to provide the aforementioned system, wherein additionally comprising a power supply unit selected from the group consisting of a battery, a rechargeable battery, an electric power source and any combination thereof.

It is also an object of the present invention to provide the aforementioned system, wherein the wireless network connection is selected from the group consisting of: Bluetooth, antenna, wireless USB, wireless sensor networks, satellite communications, mobile data service, ibeacon, zigbee, GPS and a combination thereof.

It is also an object of the present invention to provide the aforementioned system, wherein the system is activated by a single action selected from the group consisting of pressing, pushing, pulling, positioning, turning, sliding, triggering, sensing and any combination thereof.

It is also an object of the present invention to provide the aforementioned system, wherein the single finger pressable pad is activated by a single activation element selected from the group consisting of spring switch, pressing button, pushing button, pulling button, positioning button, turning button, sliding button, triggering button, sensing button and any combination thereof.

It is also an object of the present invention to provide the aforementioned system, wherein additionally comprising a USB exit.

It is also an object of the present invention to provide the aforementioned system, wherein alerting means is selected from the group consisting of: vehicle light or blinking means, voice, alarm, vehicle horn or noise means.

It is also an object of the present invention to provide the aforementioned system, wherein additionally comprising a global positioning system (GPS) device for locating vehicle location.

It is also an object of the present invention to provide the aforementioned system, wherein additionally comprising a display means which provide indication of at least one indication selected from the group consisting of: vehicle measured parameters, vehicle location, vehicle temperature, time, presence of an occupant in a vehicle and any combination thereof.

It is also an object of the present invention to provide the aforementioned system, wherein additionally comprising a subscriber identity module (SIM) to be inserted within the housing; the SIM is configured for storing outputs and inputs of the housing.

It is also an object of the present invention to provide the aforementioned system, wherein additionally comprising sensory fusion module for combining of sensory signal or data or data derived from disparate sources.

It is thus one object of the present invention to provide a method for detecting an occupant left in a parking vehicle, comprising steps of:
a. providing a portable system for detecting a child left in a vehicle, comprising:
  i. a coin-like shaped housing comprising: at least two sensor means for measuring parameters within vehicle environment; an alerting means for sending a signal to the vehicle user; and processor for providing instructions;
  ii. a user interface platform (UIP) for communicating with at least one member selected from the group consisting of the housing, a user, social network member, vehicle operation system, emergency system, any connected subject and a combination thereof;
b. activating the housing by at least one single finger pressable pad coupled to the housing;
c. sensing by the sensor means at least one parameter value;
d. alerting the user if an occupant is present in the vehicle according to minimum or maximum values of the parameters;

It is also an object of the present invention to provide the aforementioned method, wherein additionally comprising step of providing wireless means for receiving and transferring at least one signal from the sensor means to an emergency system.

It is also an object of the present invention to provide the aforementioned method, wherein additionally comprising step of displaying via display means indication of at least one indication selected from the group consisting of: vehicle measured parameters, vehicle location, vehicle temperature, time, presence of an occupant in a vehicle and any combination thereof.

It is also an object of the present invention to provide the aforementioned method, wherein the step of sensing at least one parameter selected from the group consisting of: vehicle measured parameters, vehicle location, vehicle temperature, time, presence of an occupant in a vehicle and any combination thereof.

It is also an object of the present invention to provide the aforementioned method, wherein the step of activating the housing by a single activation element selected from the group consisting of spring switch, pressing button, pushing button, pulling button, positioning button, turning button, sliding button, triggering button, sensing button and any combination thereof.

It is also an object of the present invention to provide the aforementioned method, wherein additionally comprising step of providing a power supply unit selected from the group consisting of a battery, a rechargeable battery, an electric power source and any combination thereof.

BRIEF DESCRIPTION OF THE DRAWINGS

In the following description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention. The present invention may be practiced according to the claims without some or all of these specific details. For the purpose of clarity, technical material that is known in the technical fields related to the invention has not been described in detail so that the present invention is not unnecessarily obscured.

In the accompanying drawing:

FIG. 1 presents a perspective view of the alerting system of the present invention.

DETAILED DESCRIPTION OF THE PREFERRED EMBODIMENTS

The present invention have been defined specifically to provide a portable, relocated, and transferable apparatus and system for detecting and alerting a user or system subscriber when a child left in a vehicle. The system is portable and does not need to be pre-installed in vehicle The system is affordable and is operable in any vehicle.

Furthermore, the system detects children, adults or animals unintentional left in the vehicle in vehicle.

In accordance with one embodiment, the apparatus of the present invention comprises at least one motion detecting element for detecting motion of children, infirm, elderly pets or/and animal confined within a parked vehicle or automobile.

Reference is now made to FIG. 1 which illustrates the configuration of the system of the present invention.

The system comprises a coin-like shaped housing comprising: at least two sensor means 13, 16 for measuring a variety of parameters within the vehicle environment, an alerting means 10, 12a-b for sending a signal to the vehicle user and a wireless means(not shown) for receiving and transferring at least one signal from the sensor means to an emergency system.

The system additionally comprises an on-off switch 11 and a processor 14.

The system further comprising a user interface platform (UIP) for communication with or by at least one member, player or subscriber selected from the group consisting of: a user, sensor means, vehicle operation system, emergency system, any connectable subject and a combination thereof. The UIP may further include social interactions, therefore to communicate with a social networking having set of social actors such as individuals or organizations to participate and to provide feedback accordingly.

In other embodiment of the present invention, the system UIP may communicate with the user, user relatives or friends, any subject, group, organization or module according to his geographic location or a predefined ranking list.

The system is remotely sending an alarm signal from a wireless transmitter adjacent to the motion detector and the minimum or/and maximum value of the (heat or cold) temperature sensor, and remotely receiving the alarm signal by a wireless receiver located adjacent to the vehicle horn or light system.

In other embodiments of the present invention, the sensor means is selected from the group consisting of: a motion detector sensor, temperature detector sensor, oxygen level sensor, $CO_{2\ level}$ sensor, voice detector, volume detector, mass detector, vital signs detector, sound detector, light/laser detector, pressure sensor, air exchange detector and any combination.

The pressure transducer may be activated by the weight of the sitting child.

The temperature sensor may be associated with the vehicle seat or the child seat. The temperature sensor includes an input to detect an ambient vehicle temperature, and including an output to provide a signal responsive to the ambient vehicle temperature. The system may further include a range of temperature values with maximum value and minimum value which signal the system to transmit a warning to the user via the alerting means. The system may further include instructions to calculate, compare, analyze and provide input according to the measured temperature, air pressure, oxygen or $CO_{2\ level}$ within the vehicle.

It is within the scope of the invention to provide the aforementioned system, wherein the system additionally comprising at least one algorithm selectively executed based on at least a portion of the received information.

In other embodiment of the present invention, the housing is activated by at least one single finger pressable pad coupled to a portion of the housing.

In other embodiment of the present invention, the housing is activated by a single action selected from the group consisting of pressing, pushing, pulling, positioning, turning, sliding, triggering, sensing and any combination thereof.

In other embodiment of the present invention, the single finger pressable pad is activated by a single activation element selected from the group consisting of spring switch, pressing button, pushing button, pulling button, positioning button, turning button, sliding button, triggering button, sensing button and any combination thereof. In other embodiment of the present invention, the system may further comprise at least one processor for storing or transferring data of the UIP.

In other embodiment of the present invention, the housing is connectable to the vehicle computer such that the housing may provide instructions via a processor or UIP to the vehicle computer to open or close windows, to activate the air conditioner system, to lock or open doors in the vehicle and the like.

In other embodiment of the present invention, the system additionally comprising a power supply unit selected from the group consisting of a battery, a rechargeable battery, an electric power source and any combination thereof.

In other embodiment of the present invention, the wireless network connection is selected from the group consisting of: Bluetooth, antenna, wireless USB, wireless sensor networks, satellite communications, mobile data service, ibeacon, zigbee, GPS and a combination thereof.

In other embodiment of the present invention, the housing is with a shape, dimeter and size allowing the user to disconnect it, grasp it by one hand or securely attach it to the any interior portion of the vehicle. The housing structure may be a round button-like shape, coin like shape, Disc-like shape and the like.

In other embodiment of the present invention, the housing may be attached to the vehicle by permanent installation or may be retrofitted into any type vehicle.

In other embodiment of the present invention, the system may additionally include a USB exit.

In other embodiment of the present invention, the alerting means is selected from the group consisting of: visual alarm such as vehicle light or blinking means in a variety of colours or in at least one light colour, sound alarm such as voice, vehicle horn or any predefined noise means.

The alerting means is functioned when the sensor means becomes activated.

In other embodiment of the present invention, the housing may further comprise a keyboard for dialing to emergency number or any stored phone number.

The system or/and components of the system may be placed, connected, coupled, mounted, attached, glued or the like to any interior portion the vehicle such as the front of the vehicle, the back seats of the vehicle, the infant seat or combined within the infant seat and the vehicle.

In other embodiments of the present invention, the system additionally comprising a global positioning system (GPS) device for locating vehicle location.

In other embodiment of the present invention, the system additionally comprising a display means which provides indication of at least one parameter selected from the group consisting of: vehicle measured parameters, vehicle location, vehicle temperature, time, presence of an occupant in a vehicle and any combination thereof.

In other embodiment of the present invention, the system additionally comprising a subscriber identity module (SIM) to be inserted within the housing; the SIM is configured for storing outputs and inputs of the housing.

The SIM is an integrated circuit that is intended to securely store the international mobile subscriber or user identity (IMSI) number and its related key, which are used to identify and authenticate subscribers on mobile telephony devices (such as smart phone and CPU).

The system may further provide a warning massage using information about whether the child is present in the child car seat and the ambient vehicle temperature is outside an acceptable range.

In another embodiment of the present invention, the system is based upon at least one of the following processes verification, certification, authentication and validation. Each of these processes may be a sub process of the other or an independent process of the present invention system. The level of verification or number of times the producer's data is verified against is not limited and relies upon the user's actions and inputs. The Authentication platform may be configured to present both a public identifier such as a user name or identification number and private authentication information, such as a Personal Identification Number (PIN), password, or information derived from a cryptographic key.

The system may further provide via the UIP an active message in a form selected from the group consisting of SMS, MMS, IM, IP based message and a combination thereof.

In other embodiment of the present invention, the system additionally comprises Sensor fusion module. Sensor fusion refers to combining sensory data or data derived from disparate sources such that the resulting information has less uncertainty than would be possible when these sources were used individually. The term uncertainty reduction in this case can mean more accurate, more complete, or more dependable, or refer to the result of an emerging view, such as stereoscopic vision (calculation of depth information by combining two-dimensional images from two cameras at slightly different viewpoints). In the present invention data from the temperature sensor may combine with the oxygen sensor and/or motion sensor to provide integrated data.

The data sources for a fusion process are not specified to originate from identical sensors. One can distinguish direct fusion, indirect fusion and fusion of the outputs of the former two. Direct fusion is the fusion of sensor data from a set of heterogeneous or homogeneous sensors, soft sensors, and history values of sensor data, while indirect fusion uses information sources like a priori knowledge about the environment and human input.

Sensor fusion may also be referred as (multi-sensor) Data fusion and is a subset of information fusion.

The present invention further provides a method for detecting an occupant left in a parking vehicle, comprising steps of:
a. providing a portable system for detecting a child left in a vehicle, comprising:
  i. a coin-like shaped housing comprising: at least two sensor means for measuring parameters within vehicle environment; an alerting means for sending a signal to the vehicle user; and processor for providing instructions;
  ii. a user interface platform (UIP) for communicating with at least one member selected from the group consisting of the housing, a user, social network member, vehicle operation system, emergency system, any connected subject and a combination thereof;
b. activating the housing by at least one single finger pressable pad coupled to the housing;
c. sensing by the sensor means at least one parameter value;
d. alerting the user if an occupant is present in the vehicle according to minimum or maximum values of the parameters;
wherein additionally comprising step of providing wireless means for receiving and transferring at least one signal from the sensor means to an emergency system.

In other embodiment of the present invention, the method additionally comprising step of displaying via display means indication of at least one indication selected from the group consisting of: vehicle measured parameters, vehicle location, vehicle temperature, time, presence of an occupant in a vehicle and any combination thereof.

In other embodiment of the present invention, the step of sensing at least one parameter selected from the group consisting of: vehicle measured parameters, vehicle location, vehicle temperature, time, presence of an occupant in a vehicle and any combination thereof.

In other embodiment of the present invention, the step of activating the housing by a single activation element selected from the group consisting of spring switch, pressing button, pushing button, pulling button, positioning button, turning button, sliding button, triggering button, sensing button and any combination thereof.

In other embodiment of the present invention, the method additionally comprising step of providing a power supply unit selected from the group consisting of a battery, a rechargeable battery, an electric power source and any combination thereof.

The invention claimed is:

1. A portable system for detecting the presence of a child left in a vehicle, comprising
a. a coin-like shaped housing comprising:
  i. sensor means for measuring parameters within a vehicle environment, comprising
    a motion detector sensor, configured for detecting motion of said child;
    a temperature detector sensor, configured for measuring ambient temperature in a vehicle;
    an oxygen level sensor, configured for detecting the oxygen level within said vehicle;
  ii. an alerting means for sending a signal to the vehicle user; and
  iii. a processor configured to provide instructions;
b. a user interface platform (UIP) having a wireless network connection to at least one member selected from the group consisting of: said housing, a user, vehicle operation system, social network, emergency system, connectable subject and any combination thereof;
  wherein housing is activated by at least one single finger pressable pad coupled to said housing; and
  said system further comprises a sensor fusion module configured to combine data from the temperature sensor with the oxygen sensor and the motion sensor and provide integrated sensor fusion data; and
  said processor or/and UIP is further configured to activate said alerting means according to said integrated sensor fusion data.

2. The system according to claim 1, wherein additionally comprising wireless means for receiving and transferring at least one signal from said sensor means to an emergency system.

3. The system according to claim 1, wherein said sensor means is further selected from the group consisting of: CO2 level sensor, sound detector, voice detector, volume detector, mass detector, vital signs detector, light/laser detector, pressure sensor, air exchange detector, and any combination thereof.

4. The system according to claim 1, wherein further comprising at least one processor for storing or transferring data of said UIP.

5. The system according to claim 1, wherein said housing is connectable to the vehicle computer.

6. The system according to claim 1, wherein additionally comprising a power supply unit selected from the group consisting of a battery, a rechargeable battery, an electric power source and any combination thereof.

7. The system according to claim 2, wherein said wireless means is selected from the group consisting of: Bluetooth, antenna, wireless USB, wireless sensor networks, satellite communications, mobile data service, ibeacon, zigbee, GPS and a combination thereof.

8. The system according to claim 1, wherein said single finger pressable pad is activated by a single activation element selected from the group consisting of spring switch, pressing button, pushing button, pulling button, positioning button, turning button, sliding button, triggering button, sensing button and any combination thereof.

9. The system according to claim 1, wherein additionally comprising a USB exit.

10. The system according to claim 1, wherein alerting means is selected from the group consisting of: vehicle light or blinking means, voice, alarm, vehicle horn or noise means.

11. The system according to claim 1, wherein additionally comprising a global positioning system (GPS) device for locating vehicle location.

12. The system according to claim 1, wherein additionally comprising a display means which provide indication of at least one indication selected from the group consisting of: vehicle measured parameters, vehicle location, vehicle temperature, time, presence of an occupant in a vehicle and any combination thereof.

13. The system according to claim 1, wherein additionally comprising a subscriber identity module (SIM) to be inserted within said housing; said SIM is configured for storing outputs and inputs of said housing.

14. The system according to claim 1, wherein additionally comprising sensory fusion module for combining of sensory signal or data or data derived from disparate sources.

15. The system of claim 3, wherein said processor is further configured to calculate, compare, analyze and provide input according to the measured temperature, air pressure, oxygen or $CO_2$ level within the vehicle.

16. A method for detecting the presence of an occupant left in a parked vehicle, comprising steps of:
   a. providing a portable system for detecting a child left in a vehicle, comprising:
      a coin-like shaped housing comprising: sensor means for measuring parameters within vehicle environment, comprising a temperature detector sensor configured for measuring ambient temperature in a vehicle, an oxygen level sensor adapted for detecting the oxygen level within said vehicle, and an oxygen level sensor configured for detecting the oxygen level within said vehicle; an alerting means for sending a signal to the vehicle user; and processor for providing instructions;
      a user interface platform (UIP) having a wireless network connection to at least one member selected from the group consisting of said housing, a user, social network member, vehicle operation system, emergency system, any connected subject and a combination thereof;
   b. activating said housing by at least one single finger pressable pad coupled to said housing;
   c. sensing by said sensor means at least one parameter value;
   d. combining data from the temperature sensor with the oxygen sensor and the motion sensor and providing integrated sensor fusion data; and
   e. alerting said user according to said integrated sensor fusion data.

17. The method according to claim 16, wherein additionally comprising step of providing wireless means for receiving and transferring at least one signal from said sensor means to an emergency system.

18. The method according to claim 16, wherein additionally comprising step of displaying via display means indication of at least one indication selected from the group consisting of: vehicle measured parameters, vehicle location, vehicle temperature, time, presence of an occupant in a vehicle and any combination thereof.

19. The method according to claim 16, wherein said step of sensing at least one parameter selected from the group consisting of: vehicle measured parameters, vehicle location, vehicle temperature, time, presence of an occupant in a vehicle and any combination thereof.

20. The method of claim 16, comprising steps of further providing, to said sensor means, selected from the group consisting of $CO_2$ level sensor, sound detector, voice detector, volume detector, mass detector, vital signs detector, light/laser detector, pressure sensor, air exchange detector, and any combination thereof; and calculating, comparing, analyzing and providing input according to the measured temperature, air pressure, oxygen or $CO_2$ level within the vehicle.

* * * * *